United States Patent Office 3,711,522
Patented Jan. 16, 1973

3,711,522
DIHALO STEROIDS
Perry Rosen, North Caldwell, N.J., assignor to Hoffmann-La Roche Inc., Nutley, N.J.
No Drawing. Filed Mar. 24, 1971, Ser. No. 127,767
Int. Cl. C07c 169/20
U.S. Cl. 260—397.4
26 Claims

ABSTRACT OF THE DISCLOSURE 6,7 - dihalo-$\Delta^5$-steroids and 6-fluoro-6-halo-5,7-cyclo steroids which are useful as progestational agents and a process for preparing these steroids from $\Delta^5$-steroids including intermediates in this process.

Summary of the invention

In accordance with this invention, it has been found that steroids selected from the group consisting of compounds of the formula:

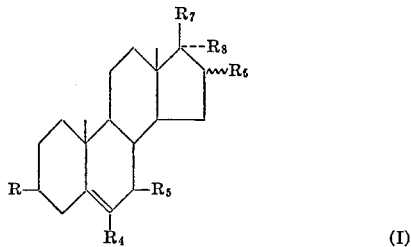

wherein R is lower alkanoyloxy, oxo, lower alkylenedioxy or hydroxy; $R_4$ is halogen; $R_5$ is chlorine or bromine; $R_6$ is hydrogen, lower alkyl or lower alkylidene; $R_7$ is acetyl; $R_8$ is hydrogen, hydroxy, lower alkanoyloxy or taken together with $R_7$, form an oxo group and compounds of the formula:

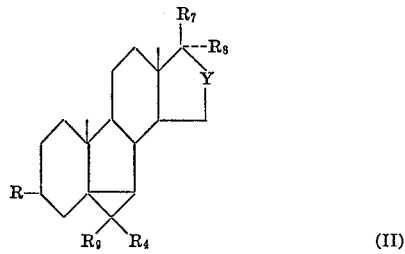

wherein R, $R_4$, $R_7$ and $R_8$ are as above; Y when $R_4$ is fluorine is

or

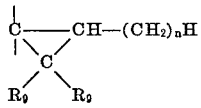

Y when $R_4$ is chlorine or bromine is

$R_6'$ is lower alkyl or hydrogen; n is an integer from 0 to 5; $R_6''$ is hydrogen, lower alkyl or lower alkylidene, $R_9$ is fluorine.

Detailed description of the invention

As used herein, the term "halogen" comprehends chlorine, fluorine and bromine. The term "lower alkyl" comprehends both straight and branched chain saturated hydrocarbon moieties having from one to six carbon atoms such as methyl, ethyl, n-pentyl or the like. The term "lower alkylenedioxy" includes lower alkylene-dioxy moieties containing from 2 to 4 carbon atoms such as ethylenedioxy, propylenedioxy, etc. The term "lower alkylidene" indicates a straight or branched chain hydrocarbon moiety having from one to six carbon atoms, the terminal carbon atom of which has two free valence bonds such as methylene, ethylidene, isopropylidene and the like with methylene being preferred. The term "lower alkanoyl" comprehends residues of lower alkane carboxylic acids such as acetyl, butyryl, caproyl or the like, containing from one to six carbon atoms. The term "lower alkanoyloxy" as used herein comprehends lower alkanoyloxy moieties wherein lower alkanoyl is defined as above. Alkali metal has its usual meaning and includes such metals as sodium, lithium, potassium and thallium.

The compounds of Formulae I and II above are characterized by a high degree of progestational activity. Thus, the compounds of Formulae I and II above can be administered internally, for example, orally or parenterally, with dosage adjusted to individual requirements in the form of conventional pharmaceutical preparations. For example, the compounds of Formulae I and II can be administered in conventional pharmaceutical solid or liquid forms such as tablets, pills, capsules, solutions, suspensions, emulsions or the like. These pharmaceutical preparations can contain conventional pharmaceutical carriers and excipients such as water, talc, corn starch, polyalkylene glycols, emulsifying agents, buffering agents, agents for the adjustment of osmotic pressure, Vaseline and the like. Though it is preferred to administer the endocrinologically useful compounds of this invention internally, the compounds of Formulae I and II above can also be administered topically. For this purpose, i.e., topical administration, these compounds can be administered in conventional topical administration forms such as ointments or creams, in combination with conventional topical carriers such as petrolatum, stearic acid or the like. Also, compositions containing an active ingredient of this invention can be subjected to conventional pharmaceutical processes such as sterilization or the like. Also, the pharmaceutical compositions of this invention can contain other active ingredients. Moreover, the endocrinologically active compounds can be administered as feed additives, and for this purpose can be admixed with conventional animal feeds or conventional animal feed premixes. Though as indicated dosage of the endocrinologically useful compounds of this invention should be adjusted to individual needs, i.e., the compounds of Formulae I and II, can be administered internally in daily dosage regimens of from about 0.005 mg./kg. p.o. to about 0.15 mg./kg. p.o. per day. The dosages can be administered in unit or divided dosage forms.

The usefulness of the compounds of this invention as progestational agents is indicated in animals, for example, the composition of this invention, when administered subcutaneously to estrogen-primed immature female rabbits for five days, shows the presence of progestational activity by a secretory type endometrial response observed on histological sections prepared from rabbits' uteri and examined microscopically. A maximal response is demonstrated by progesterone at about 200 mg./kg. s.c. for five days. As exemplary of the progestational compounds of this invention, there can be named:

6,7α-dichloro-3β,17α-dihydroxy-16-methylenepregn-5-en-20-one-diacetate;
6-fluoro-7α-chloro-3β,17-α-dihydroxy-pregn-5-ene-20-one diacetate;
3β,17α-diacetate-2',2',6,6-tetrafluoro-(16R)-spiro(5,7β-cyclopentene-16',1'-cyclopropane)-20-one; and 6,7α-dichloro-3β,17α-dihydroxy-pregn-5-ene-20-one diacetate which when examined in two rabbits, all showed progestational activity at 40 mcg./kg. day s.c. or less.

In preparing compounds of the Formula I, compounds of the formula

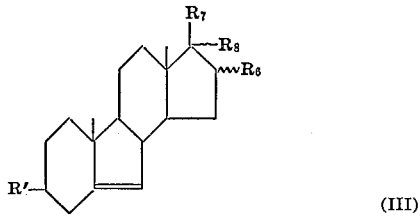

(III)

wherein $R_6$, $R_7$ and $R_8$ are as above and R' is lower alkanoyloxy or lower alkylenedioxy, are reacted with a phenyl halomethyl mercury compound of the formula

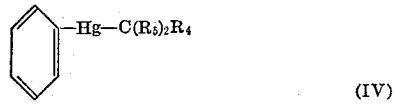

(IV)

wherein $R_4$ and $R_5$ are as above.

In carrying out this reaction at least one mole of the compound of Formula IV is present per mole of the compound of Formula III. However, this reaction can be carried out with a stoichiometric excess of either the compound of Formula III or the compound of Formula IV. This reaction is generally carried out in an inert organic solvent. In carrying out this reaction, any conventional inert organic solvent having a boiling point of at least 80° C. can be utilized. Among the preferred solvents are the aromatic solvents such as benzene, toluene, naphthalene, xylene, etc., aliphatic hydrocarbon solvents such as hexane, pentane, etc. In carrying out this reaction, any temperature of from 80° C. to the reflux temperature of the solvent medium can be utilized. Generally, it is preferred to carry out this reaction at reflux conditions utilizing benzene as the solvent medium.

When $R_4$ in the compound of Formula IV above is fluorine, the compound of Formula I is formed in admixture with a compound of the formula

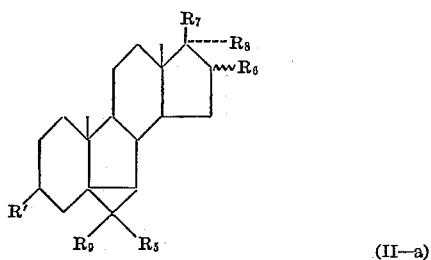

(II—a)

wherein R', $R_5$, $R_6$, $R_7$, $R_8$ and $R_9$ are as above.

The compound of Formula II–a above can be separated from the compound of Formula I by conventional means such as column chromatography.

The compound of Formula II where $R_4$ is fluorine has the following formula:

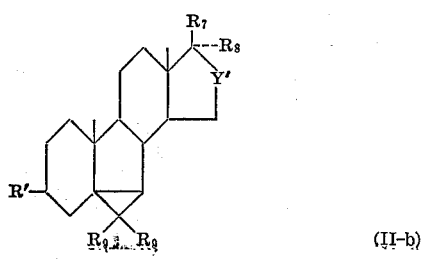

(II—b)

wherein R', $R_7$, $R_8$, and $R_9$ are as above; Y' is

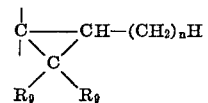

or $\overset{|}{C}H-R_6'$ and $R_6'$ is hydrogen or lower alkyl and $n$ is as above.

The compound of Formula II–B is prepared by reacting the compound of Formula III with an alkali metal salt of chlorodifluoroacetic acid at temperatures of from 150° C. to 200° C., preferably at 160–175° C. The preferred alkali metal salt is the sodium salt. This reaction is carried out in a high boiling inert organic solvent. Any conventional inert organic solvent boiling above 150° C. can be utilized in carrying out this reaction. The preferred solvent for use in this reaction is diglyme. When $R_6$ in the compound of Formula III is lower alkylidene the reaction with chlorodifluoroacetic acid to produce the compound of Formula II–B also attacks the double bond in the lower alkylidene substituent to produce a compound of Formula II–B wherein Y' is

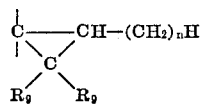

The compounds of Formulae I and II where R' is lower alkanoyloxy can be converted to the corresponding compound where R' is hydroxy by conventional basic hydrolysis techniques such as by treating these compounds with an alkali metal hydroxy such as sodium hydroxide. In carrying out this hydrolysis reaction, temperature and pressure are not critical and this reaction can be carried out at room temperature and atmospheric pressure. If desired higher or lower temperatures can be utilized.

The compound of Formula II where R is hydroxy can be converted to the corresponding compounds where R forms an oxo group by oxidation with an oxidizing agent. Any conventional oxidizing agent suitable for oxidizing hydroxy moieties to oxo moieties can be utilized. Among the preferred oxidizing agents are included manganese dioxide; chromate oxidizing agents such as the chromium trioxide, Jones reagent; etc. In carrying out this oxidation step, temperatures and pressures are not critical and this reaction can be carried out at room temperature and atomspheric pressure. If desired, higher or lower temperatures can be utilized. Generally, this oxidation step is carried out in an inert organic solvent. Any conventional inert organic solvent can be used for this purpose. Among the preferred organic solvents are included diglyme, chlorinated hydrocarbons such as methylene chloride, chloroform, etc.

In the case where R is a lower alkylenedioxy group in the compounds of Formulae I and II, these compounds can, if desired, be converted to the corresponding compounds where R is an oxo group by conventional ketal cleavage. Any conventional method of ketal cleavage can be utilized to carry out this reaction. One method of carrying out this cleavage is by treating the compounds of Formulae I and II above with a strong aqueous acid such as sulfuric or hydrochloric acid, preferably concentrated aqueous hydrochloric acid. In carrying out this reaction, temperature and pressure are not critical and this reaction can be carried out at room temperature and atmospheric pressure. However, if desired, higher or lower temperatures and pressures can be utilized, The compounds of Formula III are prepared from compounds of the formula

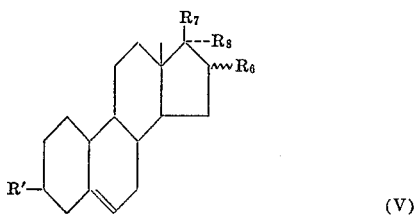

via the following reaction scheme:

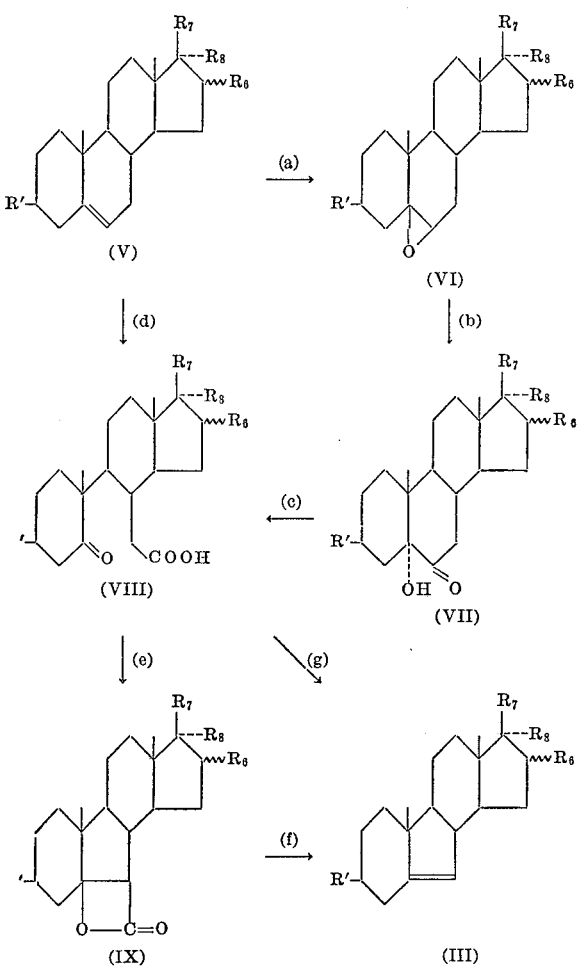

wherein R', $R_6$, $R_7$ and $R_8$ are as above.

The compound of Formula V is converted into the compound of Formula VI via reaction step (a) by treating the compound of the Formula V with an epoxidizing agent. Among the preferred epoxidizing agents which can be utilized in reaction step (a) are the per-organic acids. Any of the conventional per-organic acids can be utilized. The preferred acid for utilization in this reaction is monoperphthalic acid. Generally, this reaction is carried out at a temperature of —10° C. to about 20° C., with temperatures of from —5° C. to +5° C. being especially preferred. In carrying out the reaction of step (a), a solvent medium is generally utilized. Any conventional inert organic solvent medium can be utilized in forming the compound of the Formula VI. Among the preferred solvents are included ethers such as diethylether, tetrahydrofuran, etc., and the halogenated hydrocarbons such as chloroform, methylene chloride, carbon tetrachloride, etc. The preferred solvent for use in this reaction is chloroform.

The compound of Formula VI is converted into the compound of Formula VII by treating the compound of Formula VI with chromium trioxide. In carrying out this reaction, a temperature of from 0° C. to 40° C. can be utilized. Generally, it is preferred to carry this reaction at room temperature. In this reaction the compound of Formula VI is dissolved in an inert organic solvent and a mixture of chromium trioxide and water is added to the reaction medium. Any of the inert organic solvents mentioned hereinbefore can be utilized in carrying out this reaction. The preferred inert organic solvents which can be utilized in this reaction are butanone or acetone.

The compound of Formula VII is converted into a compound of Formula VIII via reaction step (c), by treating the compound of the Formula VII with an organic peracid. In carrying out this reaction, any conventional organic peracid can be utilized. Among the organic peracids which can be utilized are included peracetic acid, perbenzoic acid, m-chloroperbenzoic acid, etc., with m-chloroperbenzoic acid being the preferred acid. Generally, this reaction is carried out in the presence of inert organic solvent. Any conventional inert organic solvents can be utilized in this reaction. Among the organic solvents which can be utilized in this reaction are included, the ether solvents such as diethyl ether, tetrahydrofuran, and the chlorinated hydrocarbon solvents such as carbontetrachloride, chloroform, etc. The preferred organic solvents are the chlorinated hydrocarbons with chloroform being especially preferred. This reaction can be carried out in any temperature of —10° C. to about 15° C. Generally, it is preferred to carry out this reaction at a temperature of from 0° C. to 10° C.

In accordance with another embodiment of this invention, the compound of Formula V can be directly converted by oxidation to the compound of Formula VIII, via a reaction step (d). In carrying out this reaction the compounds of Formula V are treated with chromium trioxide in acetic acid or potassium dichromate. Any of the conditions conventional in oxidizing with chromium trioxide can be utilized to carry out the reaction of step (d).

In converting the compound of Formula VIII to the compound of Formula IX, via reaction step (e), the compound of Formula VIII is treated with an acid chlorinating agent in the presence of a proton acceptor. The reaction of step (e) is carried out by treating the compound of Formula VIII with an organic acid chlorinating agent. Any conventional organic acid chlorinating agent can be utilized. Among the preferred organic acid chlorinating agents are included acyl halides such as acetyl chloride, benzoyl chloride, etc., with benzoyl chloride being especially preferred.

The reaction of step (e) is carried out in the presence of a proton acceptor such as nitrogen containing heterocyclic base, e.g., pyridine, picoline, or the like; or tri-lower alkylamine, e.g., triethylamine, etc. The preferred protonic acceptor is pyridine. In carrying out this reaction, the heterocyclic base can be utilized as the solvent medium. However, if desired, this reaction can be carried out in an inert organic solvent medium. Any conventional inert organic solvent can be utilized in carrying out this reaction. Generally, solvents such as hydrocarbon solvents, for example, benzene, toluene, etc.; ethers, for example, diethyl ether or dioxane; chlorinated hydrocarbons such as chloroform, can be utilized. Generally, this reaction is carried out at a temperature of from about —10° C. to about 40° C. with room temperature being especially preferred.

The compound of Formula IX can be converted to the compound of Formula III, via reaction step (f), by heating the compound of Formula IX to a temperature of from 140° C. to 200° C., preferably 150° C. to 190° C. If desired, this reaction can be carried out without utilizing any solvent. In the case where no solvent is utilized, the compound of Formula IX is heated to a temperature of 140° C. to 200° C. under a vacuum. If it is desired to utilize a vacuum, from about 0.01 mm. Hg to about 1 mm. Hg is preferably utilized. On the other hand, the compound of Formula IX can be converted to the compound of Formula III by heating the compound of Formula IX in a solvent medium to a temperature from 140° C. to 200° C. Where a solvent medium is utilized, the reaction of step (f) can be carried out utilizing atmospheric pressure. In carrying out this reaction, any conventional inert organic solvent having a boiling point of about 140° C. can be utilized. Generally, it is preferred to utilize diglyme as the solvent medium.

If desired, the compound of Formula VIII can be directly converted to the compound of Formula III via reaction step (g). This reaction is carried out by utilizing a dehydrating agent at temperatures of from 140° C. to 200° C. Any conventional dehydrating agent can be utilized to carry out this reaction. The preferred dehydrating agent for carrying out this reaction is acetic acid anhydride. Generally, the dehydrating agent can be utilized as a solvent medium. However, if desired, an additional solvent such a conventional inert organic solvent can be utilized in this reaction. Generally, any conventional inert organic solvent having a boiling point of greater than 140° C. can be utilized to carry out this reaction.

If $R_6$ in the compound of Formula V is other than lower alkylidene, the compound of Formula V can be converted to the compound of Formula III in accordance with the following reaction scheme:

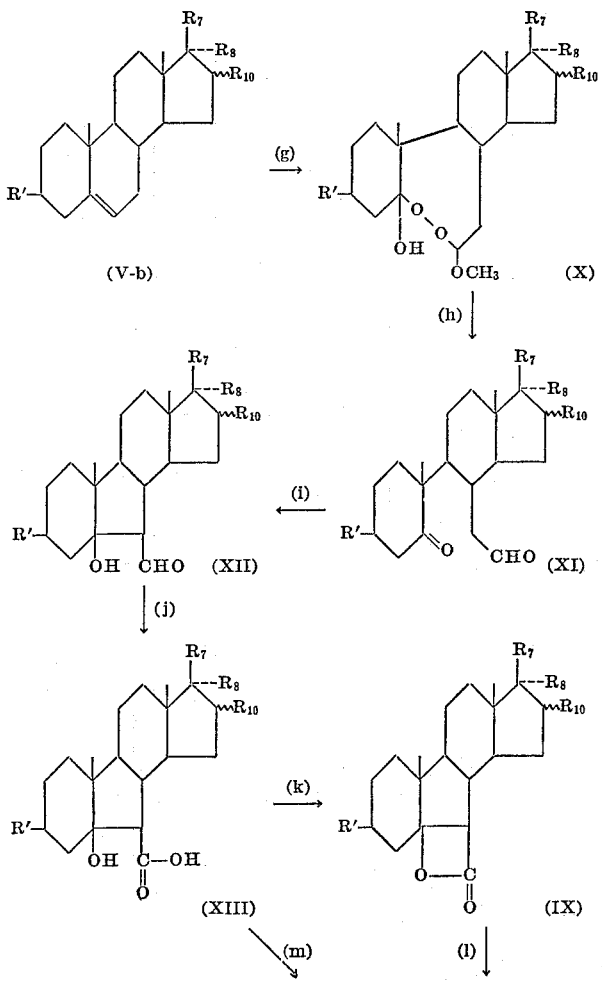

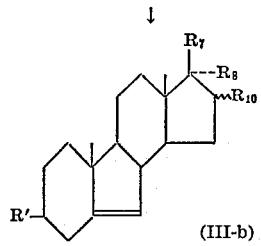

wherein R', $R_7$ and $R_8$ are as above and $R_{10}$ is hydrogen or lower alkyl.

The compounds of the Formula V-b are converted into the ozonide of Formula X via reaction step (g) by treating the compound of Formula V with ozone. Generally, this reaction is carried out at a temperature of from −50° C. to about −90° C., with −60° C. to −80° C. being especially preferred. In carrying out this reaction, any conventional low boiling inert organic solvent having a melting point below −50° C. can be utilized. Generally, the preferred solvent for utilization in this reaction is methylene chloride.

The ozonide of Formula X is converted into the compound of Formula XI by treating the compound of Formula X with zinc in a lower alkanoic acid. In carrying out this reaction any conventional lower alkanoic acid such as propionic acid, acetic acid, etc. can be utilized, with acetic acid being especially preferred. Generally, this reaction is carried out at a temperature of from −15° C. to 20° C., with −5° C. to +5° C. being preferred. In carrying out this reaction, the lower alkanoic acid can be utilized as the solvent medium. On the other hand, the solvent utilized in forming the ozonide of Formula X can be utilized as the reaction medium.

The compound of Formula XI is converted to the compound of Formula XII by treating the compound of Formula XI with alumina. This reaction can take place in an inert organic solvent medium. Any other conventional inert organic solvent can be utilized such as the solvents mentioned hereinabove in carrying out this reaction. Generally, it is preferred to utilize hydrocarbon solvents such as benzene, xylene, etc. as the solvent medium. In carrying out the reaction of step (i), temperature and pressure are not critical and this reaction can be carried out at room temperature and atmospheric pressure. However, if desired, elevated or lower temperatures can be utilized.

The compound of Formula XII is converted to the compound of Formula XIII via reaction step (j) by treating the compound of Formula XII with a chromate oxidizing agent. Any of the conventional chromate oxidizing agents such as chromium trioxide, the Jones reagent, etc. can be utilized in carrying out the reaction of step (j).

The conversion of compounds of the Formula XIII to the compounds of the Formula IX via reaction step (k) can be carried out in the same manner as described in connection with reaction step (e). The conversion of compound IX to compounds of the Formula III-b, via reaction (l), can be carried out in the same manner as described in connection with reaction step (f). The direct conversion of compounds of the Formula XIII to compounds of the Formula III-b, via reaction step (m), can be carried out in the same manner as that described in connection with reaction step (g).

The following examples are illustrative of this invention but not limitative thereof. All temperatures in the examples are in degrees centigrade.

EXAMPLE 1

3β,17α-dihydroxy-5,20-dioxo-5,6-secopregnan-6-al diacetate

A solution of 13.5 g. of 3β,17α-diacetoxy-pregn-5-ene-20-one in 150 ml. of methylene chloride and 3 ml. of methanol was ozonized at −70° C. until the development of a blue-green coloration which indicated the formation of the ozonide. Nitrogen was bubbled through the reaction mixture containing the ozonide for 15 minutes and the solution was then added dropwise at 0° C. to a slurry of 20 g. of zinc in 50 ml. of acetic acid. The mixture was then stirred at room temperature for 3 hours, filtered and the filtrate washed with water and then with an aqueous solution containing 5% by weight of sodium bicarbonate until basic. The solution was then dried ($MgSO_4$) and the solvent removed under reduced pressure. Trituration of the residue with diethyl etherhexane gave 3β,17α-dihydroxy-5,20 - dioxo-5,6-secopregnan-6-al diacetate which upon crystallization from diethyl ether-methylene chloride had a melting point of 168–171° C.

EXAMPLE 2

3β,5β,17α-trihydroxy-β-nor-6β-formyl-pregnan-20-one-3,17-diacetate

A mixture of 12.5 g. of 3β,17α-dihydroxy-5,20-dioxo-5,6-secopregnan-6-al diacetate, 600 ml. of benzene and 120 g. of grade III neutral alumina was vigorously stirred for 3 hours at room temperature. The mixture was then filtered and the alumina washed thoroughly with methylene chloride. The solvent was removed under reduced pressure to give the crude product. Crystallization from diethyl ether-methylene chloride produced 3β,5β,17α-trihydroxy-β-nor-6-β-formyl-pregnan-20-one13,17-diacetate in pure form, M.P. 183–185° C.

EXAMPLE 3

3β,17α-dihydroxy-β-norpregn-5-ene-20-one, diacetate

To a solution of 9 g. of 3β,5β,17α-trihydroxy-β-nor-6-β-formyl-pregnan-20-one-3,17-diacetate in 200 ml. of 90% acetic acid was added at 0° a solution of 3.5 g. of chromium trioxide in 80 ml. of a mixture containing 10% by weight of water and 90% by weight acetic acid. The mixture was stirred at room temperature for 4 hours after which time 20 ml. of isopropyl alcohol was added. The acetic acid was removed under high vacuum and the residue extracted several times with a 3:1 parts by volume diethyl ether-methylene chloride solution. The washings were combined and dried ($MgSO_4$). The solvent was then removed under reduced pressure to give 8 g. of 3β,17α-diacetoxy-5-hydroxy-20-oxo-β-nor-5β-pregnane 6β-carboxylic acid. This acid (8 g.) was added to 30 ml. of acetic anhydride and the mixture refluxed for 3 hours. The solution was then cooled and added 1 l. of water containing 60 g. of sodium bicarbonate. The resulting mixture was stirred for 1 hour and then extracted with diethyl ether. The ether solution was then washed with 5% by weight aqueous sodium bicarbonate, water, and then dried ($MgSO_4$). The solvent was removed under reduced pressure and the residue triturated with methanol to give 3β,17α-dihydroxy-β-norpregn-5-ene-20-one, diacetate, M.P. 215–218° C. which upon crystallization from methanol had a melting point of 217–218° C.

EXAMPLE 4

3β-acetoxy-β-norandrost-5-en-17-one

A solution of 50 g. (0.15 mole) of 3β-acetoxyandrost-5-en-17-one in 500 ml. of methylene chloride was ozonized at −70° C. with an ozone flow of approximately 0.04 mole/hour. At the end of 3 hours the solution turned blue, the ozone was stopped, and the solution flushed with a stream of nitrogen. The colorless solution was then added dropwise at 0° C. to a mixture of 100 g. of zinc powder in 500 ml. of acetic acid and stirred at that temperature for 6 hours. At the end of this time the methylene chloride was removed under reduced pressure and the residue dissolved in 1.2 l. of a mixture containing 10% by weight of water and 90% by weight of acetic acid. To the solution at 0° C. was added dropwise a solution of 20 g. of chromium trioxide dissolved in 400 ml. of 90% acetic acid. The mixture was stirred at room temperature for 5 hours after which time 100 ml. of ethanol was added and the mixture stirred for an additional 15 minutes. The solvent was then removed at 35° C. under high vacuum and the residue treated with 2 l. of water. The mixture was then extracted with diethyl ether and the ether solution repeatedly washed with water. The ether solution was then dried ($MgSO_4$) and the solvent removed under reduced pressure to produce the keto acid 3β - acetoxy-5-hydroxy-17-oxo-β-nor-5β-androstane-6β-carboxylic acid. This acid was then dissolved in 100 ml. of pyridine followed by the addition at 0° C. of 50 ml. of benzoyl chloride. The mixture was then stirred at room temperature for 48 hours, cooled to 0° C. and 50 ml. of methanol then added. After stirring for 0.5 hour, 2.5 l. of water was added and the mixture extracted with diethyl ether-methylene chloride (9:1 parts by volume). The organic layer was washed with water, dilute hydrochloric acid (until pyridine is completely removed) and dried ($MgSO_4$). The solvent was then removed under reduced pressure and the residue triturated with diethyl ether to give 18 g. of yellow crystalline 3β-acetoxy-5-hydroxy17-oxo-β-nor-5β-androstane 6β-carboxylic acid-β-lactone. The solvent was removed from the mother liquor under reduced pressure and the residue pyrolysed at 200° C./0.1 mm. Hg for 10 minutes. The crude product was dissolved in a small amount of benzene and washed through 200 g. of neutral alumina (grade 1) with 1 l. of benzene to give 11 g. of 3β-acetoxy-β-norandrost-5-en-17-one, M.P. 129–133° C.

EXAMPLE 5

6,7α-dichloro-3β,17α-dihydroxypregn-5-ene-20-one, diacetate

A solution of 1 g. of 3β,17α-dihydroxy-β-norpregn-5-ene-20-one, diacetate and 1.98 g. of phenyl(trichloromethyl) mercury in 10 ml. of dry benzene was refluxed for 48 hours. The mixture was cooled and the precipitated phenyl-mercuric chloride filtered. The solvent was removed from the filtrate under reduced pressure and the residue chromatographed on 15 g. of silica gel. From a mixture containing 2.5% by volume ethyl acetate in 97.5% by volume of benzene used as an eluent, there was obtained 0.705 g. of a yellow foam which upon trituration with diethyl ether gave 6,7α-dichloro-3β,17α-dihydroxypregn-5-ene-2-one, diacetate.

EXAMPLE 6

16-methylene-3β,5α,17α-trihydroxypregnan-6,20-dione 3,17-diacetate

To a solution of 5 g. (0.0177 mole) of 16-methylene-3β,17α-dihydroxy-pregn-5-en-20-one diacetate in 40 ml. of alcohol free chloroform was added 26.7 ml. of an ethereal solution of monoperphthalic acid (115 mg./ml.). After 12 hours at 0° C., 100 ml. of diethyl ether was added and the solution washed with an aqueous solution containing 5% by weight of sodium bicarbonate (until basic), water and then dried ($MgSO_4$). The solvent was removed under reduced pressure to give 5 g. of 16-methylene-3β,17α-dihydroxy-5,6-epoxy-pregnan-20-one diacetate. To a suspension of this epoxide (4.5 g.) in 50 ml. of butanone was added 5 ml. of a solution composed of 15 g. of chromium trioxide in 20 ml. of water. After stirring for 30 minutes, the mixture was poured into 500 ml. of ice water and the precipitate was filtered and air dried for one hour. The product was then dissolved in a minimum of chloroform and dried (MgSO$_4$). The solvent was removed under reduced pressure to give 16-methylene-3β,5α,17α-trihydroxypregnan-6,20-dione 3,17-diacetate which upon crystallization from ethanol had a melting point of 256–258° C. d.

EXAMPLE 7

3β,17α-dihydroxy-16-methylene-β-norpregn-5-ene-20-one diacetate

To a solution of 44 g. of 16-methylene-3β,5α,17α-trihydroxy-pregnan-6,20-dione 3,17-diacetate dissolved in 300 ml. of alcohol free chloroform was added slowly 60 g. of 87% by weight of m-chloroperbenzoic acid and 13% by weight of water dissolved in 600 ml. of chloroform. The temperature was maintained below 30° C. during the addition. The solution was then stirred for 1.5 hours at room temperature, cooled to 10° C., and 250 ml. of a 20% sodium bisulfite solution added. The mixture was stirred for 10 minutes and then filtered to give 27.5 g. of m-chlorobenzoic acid. The organic layer was separated, dried (MgSO$_4$), and the solvent removed under reduced pressure. The residue was treated with 250 ml. of benzene and the mixture again filtered to give a second crop (20 g.) of m-chlorobenzoic acid. The remaining m-chlorobenzoic acid was extracted from the benzene filtrate by washing with 3× 50 ml. of an aqueous solution containing 5% by weight of sodium bicarbonate. The benzene solution was then washed with 2× 100 ml. of an aqueous solution containing 5% by weight sodium carbonate and the extracts immediately acidified in the cold. The mixture was extracted with diethyl ether, the ether solution dried (MgSO$_4$) and the solvent removed under reduced pressure to give 21 g. of 3β,17α-diacetoxy-5,20-dioxo-5,6-seco-16-methylenepregnan-6-oic acid, as a white foam. To a solution of the seco-acid (24 g.) in 50 ml. of dry pyridine was added 24 ml. of benzoyl chloride. The dark mixture was then stirred overnight after which time 10 ml. of dry methanol was added. The mixture was stirred for an additional 30 minutes and then poured into 800 ml. of ice water. The mixture was extracted with diethyl ether and the ether solution washed with 1 N aqueous sodium hydroxide solution, water and then dried (MgSO$_4$). Removal of the solvent under reduced pressure gave 42 g. of 3β,17α-diacetoxy-5,20-dioxo-5,6-seco-16-methylenepregnan-6-oic acid-β-lactone as a dark oil. The residue was then subjected to high vacuum (0.1 mm.) and heated to 70° C. at which temperature the methylbenzoate distilled. The residue was then pyrolysed at this pressure by heating to 200° C. for 10 minutes. Trituration of the residue was methanol gave 7.4 g. of a brown solid. Crystallization from methanol afforded 3β,17α-dihydroxy-16-methylene-β-norpregn-5-ene - 20 - one diacetate, M.P. 178.5–180.5° C.

EXAMPLE 8

6,7α-dichloro-3β,17β-dihydroxy-16-methylenepregn-5-ene-20-one, diacetate

A solution of 0.5 g. of 3β,17α-dihydroxy-16-methylene-β-norpregn-5-ene-20-one diacetate and 0.954 g. of phenyltrichloromethyl mercury in 5 ml. of dry benzene was refluxed under nitrogen for 48 hours. The mixture was filtered and the solvent removed from the filtrate under reduced pressure. The residue was chromatographed through 15 g. of silica gel. From an eluent containing 2.5% by volume ethyl acetate and 97.5% benzene there was obtained a yellow foam which upon crystallization from diethyl ether gave 6,7α-dichloro-3β,17α-dihydroxy-16-methylenepregn-5-ene-20-one, diacetate.

EXAMPLE 9

6,6-difluoro-3β,17α-dihydroxy-5,7-β-cyclopregnan-20-one, diacetate

To a refluxing solution of 3 g. of 3β,17α-dihydroxy-β-norpregn-5-ene-20-one diacetate dissolved in 40 ml. of diglyme was added over a 45 minute period a solution of 17 g. of sodium chlorodifluoroacetate in 100 ml. of diglyme. At the end of the addition the mixture was refluxed another 15 minutes and the solvent removed under high vacuum. The residue was dissolved in a minimum of benzene and chromatographed through 50 g. of silica gel. An eluent containing 5% by weight of ethyl acetate and 95% by weight of benzene gave a white foam which triturated with diethyl ether afforded 6,6-difluoro-3β,17α-dihydroxy-5,7-β-cyclopregnan - 20 - one, diacetate, M.P. 213° C.

EXAMPLE 10

6,6-difluoro-3β-acetoxy-5,7-β-cyclo-5β-androstan-17-one

To a refluxing solution of 1 g. of 3β-acetoxy-β-norandrost-5-en-17-one in 10 ml. of dry diglyme was added over a 45 minute period, a solution of 7.1 g. of the sodium salt of chlorodifluoroacetic acid dissolved in 50 ml. of diglyme. After the addition was completed, the mixture was refluxed for another 15 minutes and the solvent removed under high vacuum. The residue was suspended in a small amount of benzene and washed through 15 g. of neutral alumina (grade 1) to give the product 6,6-difluoro-3β-acetoxy-5,7-β-cyclo - 5β - androstan - 17 - one. Trituration with hexane gave the product a melting point of 186–188° C.

EXAMPLE 11

6,6-difluoro-3β-hydroxy-5,7-β-cyclo-5β-androstan-17-one

To a solution of 5.78 g. of 6,6-difluoro-3β-acetoxy-5,7-β-cyclo-5β-androstan-17-one dissolved in 250 ml. of glyme was added under an atmosphere of argon 55.4 ml. of a 0.284 molar solution of sodium hydroxide in ethanol. After stirring for 20 minutes the solvent was removed at room temperature under high vacuum and the product precipitated by the addition of water. The precipitate was filtered and air dried overnight under high vacuum. Crystallization from diethyl ether-methylene chloride afforded 6,6-difluoro-3β-hydroxy-5,7-β-cyclo-5β-androstan-17-one, .P. 190° C.

EXAMPLE 12

3β,17α-diacetoxy-2′,2′,6,6-tetrafluoro-(16R)-spiro (5,7β-cyclopregnan-16, 1′-cyclopropane)-20-one To a refluxing solution of 1 g. of 3β,17α-dihydroxy-16-methylene-β-norpregn-5-ene-20-one diacetate dissolved in 50 ml. of dry diglyme was added dropwise (over a 45 minute period) a solution of 5.52 g. of sodium chlorodifluoroacetate dissolved in 50 ml. of the same solvent. After the addition was completed the mixture was refluxed for an additional 15 minutes. The mixture was then cooled and filtered and the solvent removed under high vacuum. The residue was chromatographed on 25 g. of silica gel. Elution with a solution containing 5% by volume of ethyl acetate and 95% by volume of benzene afforded 3β,17α-diacetoxy-2′,2′,6,6-tetrafluoro-(16R) - spiro (5,7β-cyclopregnan-16, 1′-cyclopropane)-20-one which upon crystallization from methylene chloride diethyl ether had a melting point of 190–192.5° C.

EXAMPLE 13

A solution of 3 g. of 3β-acetoxy-β-norandrost-5-ene-17-one and 6 g. of phenyl (fluorodichloromethyl) mercury in 50 ml. of dry benzene was refluxed for 48 hours. The precipitated phenylmercuric chloride was then filtered and the filtrate concentrated under reduced pressure. Chromatography of the residue on 75 g. of silica gel afforded 6-chloro - 6 - fluoro - (R)-3β-acetoxy-5,7-cyclo-5β-androstan-17-one which when crystallized from diethyl ether methylene chloride had a melting point of 185–190° C. d.

Continuation of the chromatography with the mixture of 2% by volume of ethyl acetate and 98% by volume of benzene gave 6-fluoro-7α-chloro-3β-acetoxy-androst-5-en-17-one.

EXAMPLE 14

A solution of 3 g. of 3β,17α-dihydroxy-β-norpregn-5-ene-20-one, diacetate and 6 g. of phenyl (fluorodichloromethyl) mercury in 50 ml. of dry benzene was refluxed for 60 hours. The mixture was cooled and the precipitated phenylmercuric chloride filtered off. Most of the solvent was removed under reduced pressure and the residue chromatographed on 90 g. of silica gel. The column was eluted with 1500 ml. of benzene followed by 1 l. of a mixture containing 2% by volume ethyl acetate and 98% by volume benzene. From the latter eluent was obtained 1.5 g. of 6-fluoro-6-chloro-(R)-3β,17α-dihydroxy-5,7-cyclo-5β-pregnan-20-one diacetate, M.P. 138–141° C.

Continuation of the chromatography with 2% ethylacetate and 98% benzene gave firstly 1 g. of a 1:1 mixture (TlC) of compounds 6-fluoro-6-chloro-(R)-3β,17α-dihydroxy-5,7-cyclo-5β-pregnan-20-one diacetate and 6-fluoro - 7α - chloro - 3β,17α-dihydroxy-pregn-5-en-20-one diacetate. This was followed by 0.4 g. of 6-fluoro-7α-chloro-3β,17α-dihydroxy-pregn-5 - en - 20 - one diacetate which upon crystallization from diethyl ether hexane had a melting point of 173–175° C.

EXAMPLE 15

6-chloro-6-fluoro-(R)-5,7-cyclo-5β-androstane-3,17-dione

To a solution of 0.325 g. of 6-chloro-6-fluoro-(R)-3β-acetoxy-5,7-cyclo-5β-androstan-17-one dissolved in 10 ml. of glyme was added 3.5 ml. of a 0.244 molar solution of sodium hydroxide in ethanol. After stirring for 20 minutes at room temperature, the solvent was removed under reduced pressure and water added to the residue. The mixture was extracted with diethyl ether and the ether solution dried (MgSO$_4$). The solvent was removed to give 0.298 g. of the alcohol of 6-chloro-6-fluoro-(R)-3β-hydroxy-5,7-cyclo-5β-androstan-17-one. The alcohol (0.29 g.) was dissolved in acetone (10 ml.) and 0.23 ml. of Jones reagent added at 0° C. The mixture was stirred at this temperature for 25 minutes after which time 1 ml. of isopropanol was added. The solvent was removed under reduced pressure and the residue triturated with water. The mixture was extracted with ether, the ether solution dried (MgSO$_4$) and the solvent removed. Crystallization of the residue from diethyl ether-methylene chloride gave 6-chloro-6-fluoro-(R)-5,7-cyclo-5β-androstan - 3,17 - dione, M.P. 182° C. d.

EXAMPLE 16

Tablet formulation: Per tablet, mg.

| | |
|---|---|
| 6,7α - dichloro - 3β,17α-dihydroxypregn-5-ene-20-one, diacetate | 2.55 |
| Dicalcium phosphate, unmilled | 232.45 |
| Corn starch | 12.50 |
| Magnesium stearate | 2.50 |
| Total weight | 250.00 |

Procedure:

(1) 6,7α-dichloro - 3β,17α - dihydroxypregn-5-ene-20-one, diacetate and corn starch were blended in a suitable size mixer.
(2) The mix was then blended with an equal quantity of dicalcium phosphate.
(3) The mixture was blended for five minutes with the balance of the dicalcium phosphate and magnesium stearate.
(4) The mixture was then compressed.

EXAMPLE 17

A tablet was formed in the same manner as in Example 21 utilizing 6,7α-dichloro-3β,17α-dihydroxy-16-methylenepregn-5-ene-20-one, diacetate.

EXAMPLE 18

A tablet was formed in the same manner as in Example 21 utilizing 6,6-difluoro-3β-hydroxy-5,7-β-cyclo-5β-androsten-17-one.

EXAMPLE 19

Capsule formulation: Per capsule, mg.

| | |
|---|---|
| 6,7α-dichloro-3β,17α-dihydroxypregn-5-ene-20-one, diacetate | 5 |
| Lactose | 178 |
| Corn starch | 37 |
| Talc | 5 |
| Total weight | 225 |

Procedure:

(1) 6,7α-dichloro - 3β,17α - dihydroxypregn-5-ene-20-one, diacetate was mixed with the lactose and corn starch in a suitable mixer.
(2) The mixture was further blended by passing through a Fitzpatrick Comminuting Machine with a No. 1A Screen with knives forward.
(3) The blended powder was returned to the mixer, the talc added and blended thoroughly. The mixture was then filled in No. 4 hard shell gelatin capsules on a Parke Davis capsulating machine (any similar type machine may be used).

EXAMPLE 20

A capsule was formed in the same manner as in Example 19 utilizing 6,7α-dichloro - 3β,17α - dihydroxy-16-methylenepregn-5-ene-20-one, diacetate.

EXAMPLE 21

A capsule was formed in the same manner as in Example 19 utilizing 6,6-difluoro-3β-hydroxy-5,7-β-cyclo-5β-androsten-17-one.

EXAMPLE 22

Suppository formulation: Per 1.3 gm. suppository, gm.

| | |
|---|---|
| 6,7α-dichloro-3β,17α-dihydroxypregn-5-ene-20-one, diacetate | 0.005 |
| Wecobee M* | 1.250 |
| Carnauba wax | 0.045 |

*Coco butter—coconut derived fat having a melting point of 96° F. to 98° F.

Procedure:

(1) The Wecobee M and the carnauba wax were melted in a suitable size glass lined container (stainless steel may also be used) mixed well and cooled to 45° C.
(2) 6,7α - dichloro - 3β,17α - dihydroxypregn - 5 - ene-20-one, diacetate which had been reduced to a fine powder with no lumps, was added and stirred until completely and uniformly dispersed.
(3) The mixture was poured into suppository molds to yield suppositories having an individual weight of 1.3 grams.
(4) The suppositories were cooled and removed from molds. They were individually wrapped in wax paper for packaging (foil may also be used.).

EXAMPLE 23

A suppository was formed in the same manner as in Example 22 utilizing 6,7α-dichloro-3β,17α-dihydroxy-16-methylenepregn-5-ene-20-one, diacetate.

EXAMPLE 24

A suppository was formed in the same manner as in Example 2 utilizing 6,6-dichloro-3β-hydroxy-5,7-β-cyclo-5β-androstan-17-one.

I claim:
1. A compound of the formula:

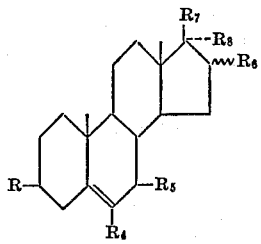

wherein R is lower alkanoyloxy, oxo, lower alkylenedioxy or hydroxy; $R_4$ is halogen; $R_5$ is chlorine or bromine; $R_6$ is hydrogen, lower alkyl or lower alkylidene; $R_7$ is acetyl; $R_8$ is hydroxy, lower alkanoyloxy or taken together with $R_7$ forms an oxo group.

2. The compound of claim 1 wherein $R_7$ and $R_8$ form an oxo group.
3. The compound of claim 2 wherein said compound is 6-fluoro-7α-chloro-3β-acetoxy-androst-5-en-17-one.
4. The compound of claim 1 wherein $R_7$ is acetyl.
5. The compound of claim 4 wherein said compound is 6,7α-dichloro-3β,17α-dihydroxypregn-5-ene-20-one, diacetate.
6. The compound of claim 4 wherein said compound is 6,7α-dichloro-3β,17α-dihydroxy-16-methylenepregn-5-ene-20-one, diacetate.
7. The compound of claim 4 wherein said compound is 6-fluoro-7α-chloro-3β,17α-dihydroxypregn-5-ene-20-one, diacetate.
8. A compound of the formula:

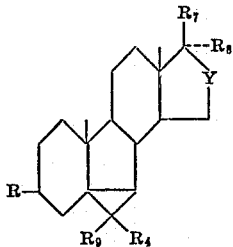

wherein R is lower alkanoyloxy, oxo, lower alkylenedioxy or hydroxy; $R_4$ is halogen; Y when $R_4$ is fluoro is

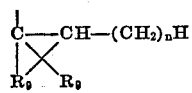

or

Y when $R_4$ is chlorine or bromine is

$R_6''$ is hydrogen, lower alkyl or lower alkylidene; $R_6'$ is hydrogen or lower alkyl; $R_8$ is lower alkanoyloxy or hydroxy; $n$ is an integer from 0 to 5; $R_7$ is acetyl or taken together with $R_8$ forms an oxo group; $R_9$ is fluorine.

9. The compound of claim 8 wherein $R_4$ is fluorine.
10. The compound of claim 9 wherein said compound is 6,6-difluoro-3β,17α-dihydroxy-5,7-β-cyclopregnan-20-one, diacetate.
11. The compound of claim 9 wherein said compound is 6,6-difluoro-3β-acetoxy-5,7-β-cyclo-5β-androstan-17-one.
12. The compound of claim 9 wherein said compound is 6,6-difluoro-3β-hydroxy-5,7-β-cyclo-5β-androstan-17-one.
13. The compound of claim 9 wherein said compound has the formula:

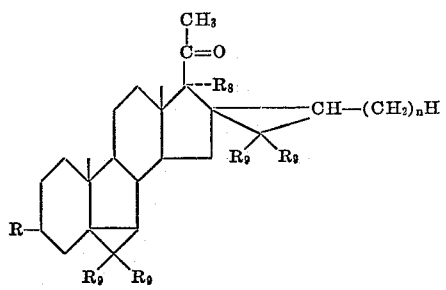

wherein R, $R_8$, $R_9$ and $n$ are as above.

14. The compound of claim 13 wherein said compound is 3β,17α-diacetoxy-2',2',6,6-tetrafluoro-(16R)-spiro(5,7β-cyclopregnan-16,1'-cyclopropane)-20-one.
15. The compound of claim 8 wherein $R_4$ is chlorine.
16. The compound of claim 15 wherein said compound is 6-chloro-6-fluoro (R)-3β-acetoxy-5,7-cyclo-5β-androstan-17-one.
17. The compound of claim 15 wherein said compound is 6-fluoro-6-chloro (R)-3,β,17α-dihydroxy-5,7-cyclo-5β-pregnan-20-one acetate.
18. The compound of claim 15 wherein said compound is 6-chloro-6-fluoro (R)-5,7-cyclo-5β-androstane-3,17-dione.
19. A compound of the formula:

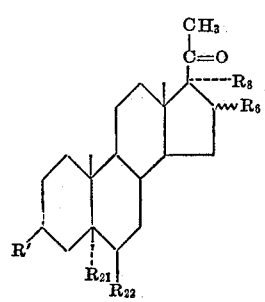

wherein R' is lower alkanoyloxy or lower alkylenedioxy; $R_8$ is hydroxy, lower alkanoyloxy; $R_6$ is hydrogen, lower alkyl or lower alkylidene; $R_{21}$ is hydroxy; $R_{22}$ is oxo or taken together with $R_{21}$ form —O—.

20. The compound of claim 19 wherein said compound is 16-methylene-3β,5α,17α-trihydroxypregnan-6,20-dione 3,17-diacetate.
21. A process for preparing a compound of the formula:

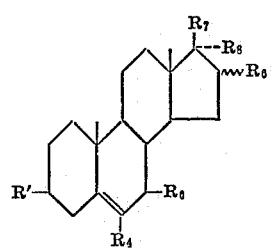

wherein
R' is lower alkanoyloxy or lower alkylenedioxy; $R_6$ is hydrogen, lower alkanoyloxy, or lower alkylidene;
$R_8$ is hydroxy, or lower alkanoyloxy; $R_7$ is acetyl or taken together with $R_8$ forms an oxo group; $R_5$ is chlorine, or bromine and $R_4$ is halogen comprising reacting a compound of the formula:

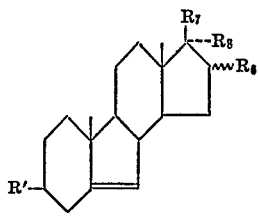

wherein $R'$, $R_6$, $R_7$ and $R_8$ are as above with a compound of the formula:

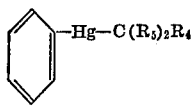

wherein $R_4$ and $R_5$ are as above in an inert organic solvent at a temperature of from 80° C. to the reflux temperature of the solvent.

22. A process for producing a 6,6-dihalo compound of the formula:

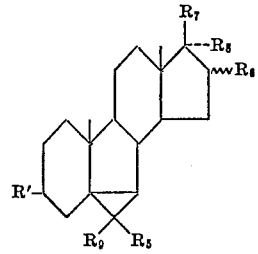

wherein
$R'$ is lower alkanoyloxy or lower alkylenedioxy; $R_6$ is hydrogen, lower alkanoyloxy or lower alkylidene; $R_8$ is hydroxy, or lower alkanoyloxy; $R_7$ is acetyl or taken together with $R_8$ forms an oxo group; $R_5$ is chlorine, or bromine and $R_9$ is fluorine
comprising reacting in an inert organic solvent a compound of the formula:

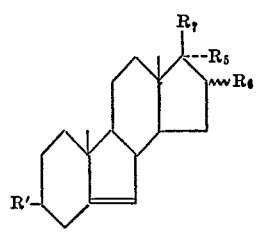

wherein $R'$, $R_5$, $R_6$ and $R_7$ are as above with a compound of the formula:

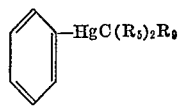

wherein $R_5$ and $R_9$ are as above
at a temperature of from 80° C. to the reflux temperature of said solvent to form said 6,6-dihalo compound in admixture with a 6,7-dihalo of the formula:

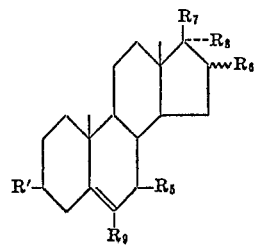

wherein $R'$, $R_5$, $R_6$, $R_7$, $R_8$ and $R_9$ are as above and separating said 6,6-dihalo compound from said 6,7-dihalo compound.

23. A process for preparing a compound of the formula:

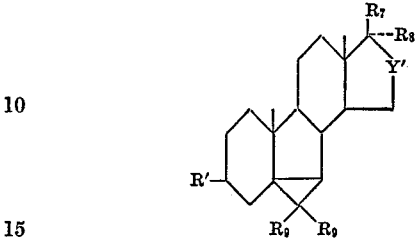

wherein
$R'$ is lower alkanoyloxy or lower alkylenedioxy; $Y'$ is

or

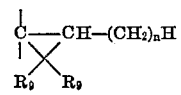

$R_6'$ is hydrogen or lower alkyl; $R_8$ is lower alkanoyloxy or hydroxy; $R_7$ is acetyl or taken together with $R_6$ is oxo; $R_9$ is fluorine and $n$ is an integer from 0 to 5;
comprising reacting a compound of the formula

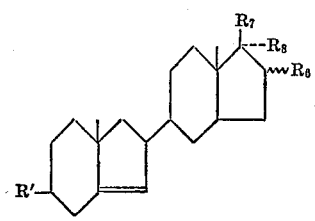

wherein $R'$, $R_7$ and $R_8$ are as above and $R_6$ is lower alkyl, lower alkylidene or hydrogen
with the alkali metal salt of chlorodifluoroacetic acid at temperatures of from 150° C. to 200° C. in the presence of an inert organic solvent.

24. The process of claim 23 wherein a compound of the formula:

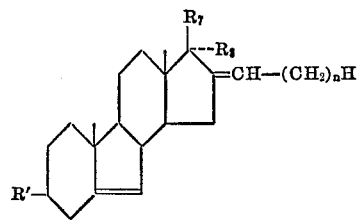

wherein
$R'$, $R_7$ and $R_8$ are as above and $n$ is an integer from 0 to 5
is reacted with the alkali metal salt of chlorodifluoroacetic acid to form a compound of the formula:

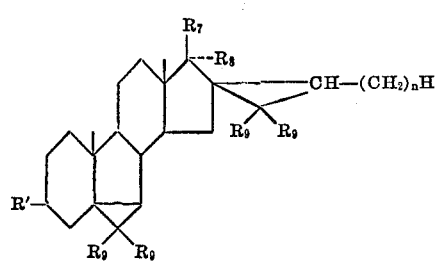

wherein $R_9$ is fluorine and $R'$, $R_7$, $R_8$ and $n$ are as above.

25. A process for producing a compound selected from the group consisting of compounds of the formula:

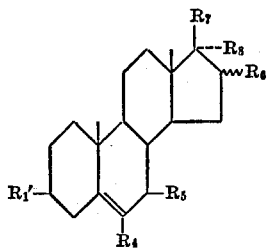

wherein $R_1'$ is hydroxy or oxo; $R_4$ is halogen; $R_5$ is chlorine, or bromine; $R_6$ is hydrogen, lower alkyl or lower alkylidene; $R_8$ is hydrogen, hydroxy or lower alkanoyloxy; $R_7$ is acetyl or taken together with $R_8$ forms an oxo group and compounds of the formula:

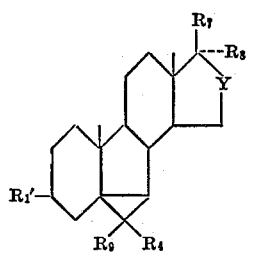

wherein $R_4$, $R_7$ and $R_8$ are as above; $R_1'$ is hydroxy or oxo; Y when $R_4$ is fluorine is

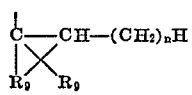

or

Y when $R_4$ is chlorine or bromine is

$R_5$ is hydrogen, lower alkyl or lower alkylidene; $R_6'$ is lower alkyl or hydrogen; $R_9$ is fluorine; and $n$ is an integer from 0 to 5;

comprising subjecting a compound selected from compounds of the formula:

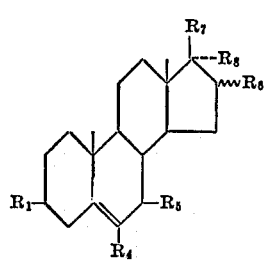

wherein $R_1$ is lower alkanoyloxy or lower alkylenedioxy; $R_4$, $R_5$, $R_6$, $R_7$ and $R_8$ are as above;

and compounds of the formula:

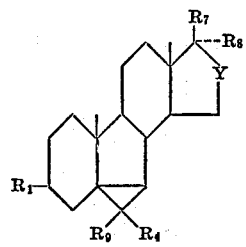

wherein $R_1$, $R_4$, $R_7$, $R_8$, $R_9$ and Y are as above when $R_1$ is lower alkanoyloxy to basic hydrolysis or when $R_1$ is lower alkylenedioxy to acidic ketal cleavage.

26. A process for producing a compound selected from compounds of the formula:

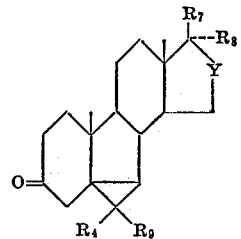

wherein $R_4$ is halogen; $R_7$ is acetyl; $R_8$ is hydrogen, hydroxy, lower alkanoyloxy or taken together with $R_7$ form an oxo group; Y when $R_4$ is fluorine is

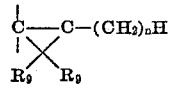

or

Y when $R_4$ is chlorine or bromine is

$R_6''$ is hydrogen, lower alkyl or lower alkylidene; $R_6'$ is hydrogen or lower alkyl; $R_9$ is fluorine; and $n$ is an integer from 0 to 5 with the provision that when $R_4$ is fluorine, $R_6'$ is other than lower alkylidene comprising oxidizing a compound of the formula:

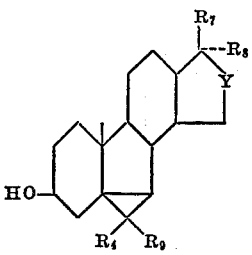

wherein $R_7$, $R_8$, $R_4$, $R_9$ and YY are as above.

References Cited
UNITED STATES PATENTS
3,478,066  11/1969  Beard et al. _____ 260—397.3

ELBERT L. ROBERTS, Primary Examiner

U.S. Cl. X.R.
260—239.55 R, 239.55 C, 397.3, 488, 340.9; 424—242